March 16, 1926.
E. L. A. SAVY
1,576,936
CONFECTIONERY MACHINERY
Filed Feb. 27, 1925
3 Sheets-Sheet 1
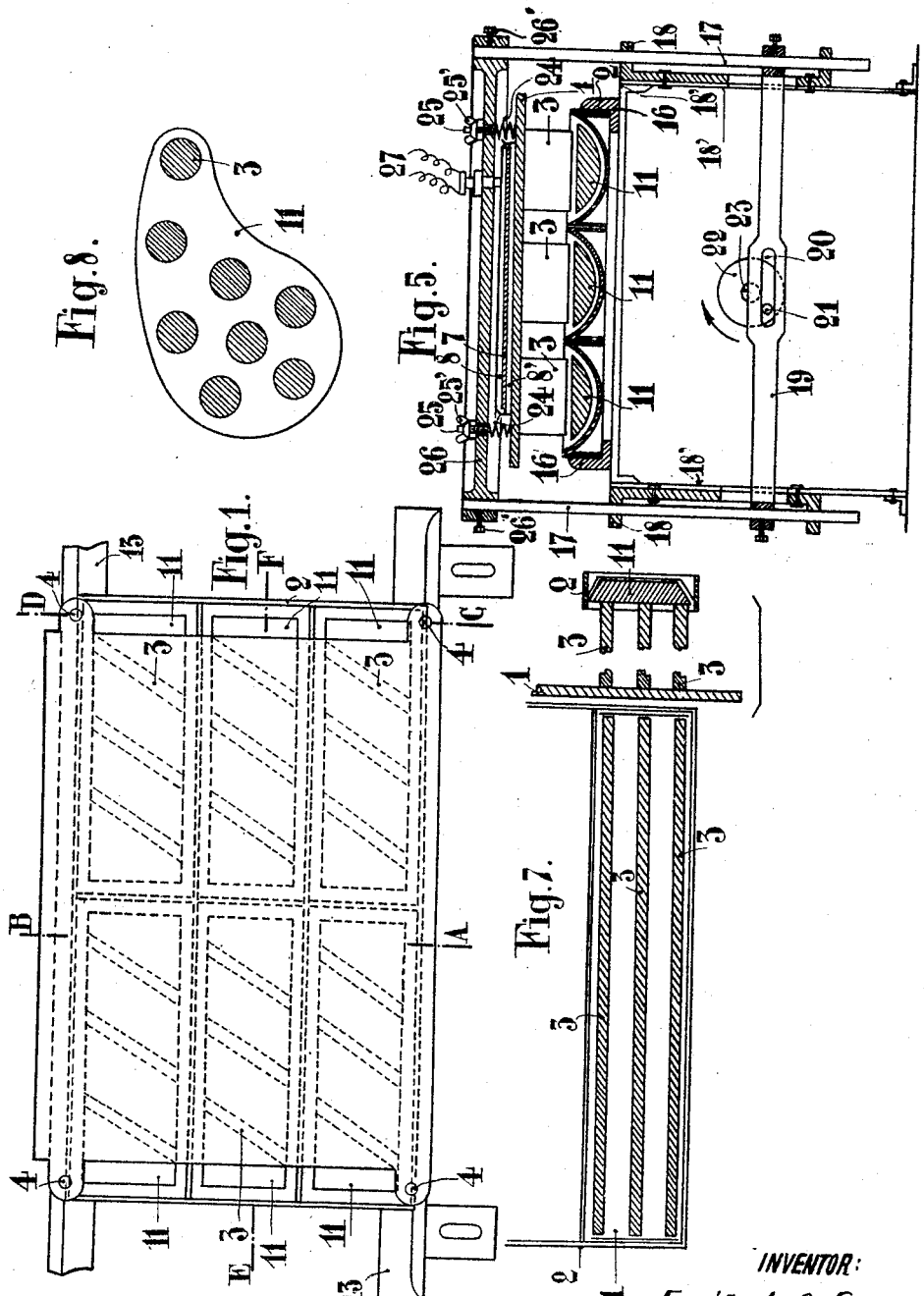

March 16, 1926.
E. L. A. SAVY
1,576,936
CONFECTIONERY MACHINERY
Filed Feb. 27, 1925
3 Sheets-Sheet 2
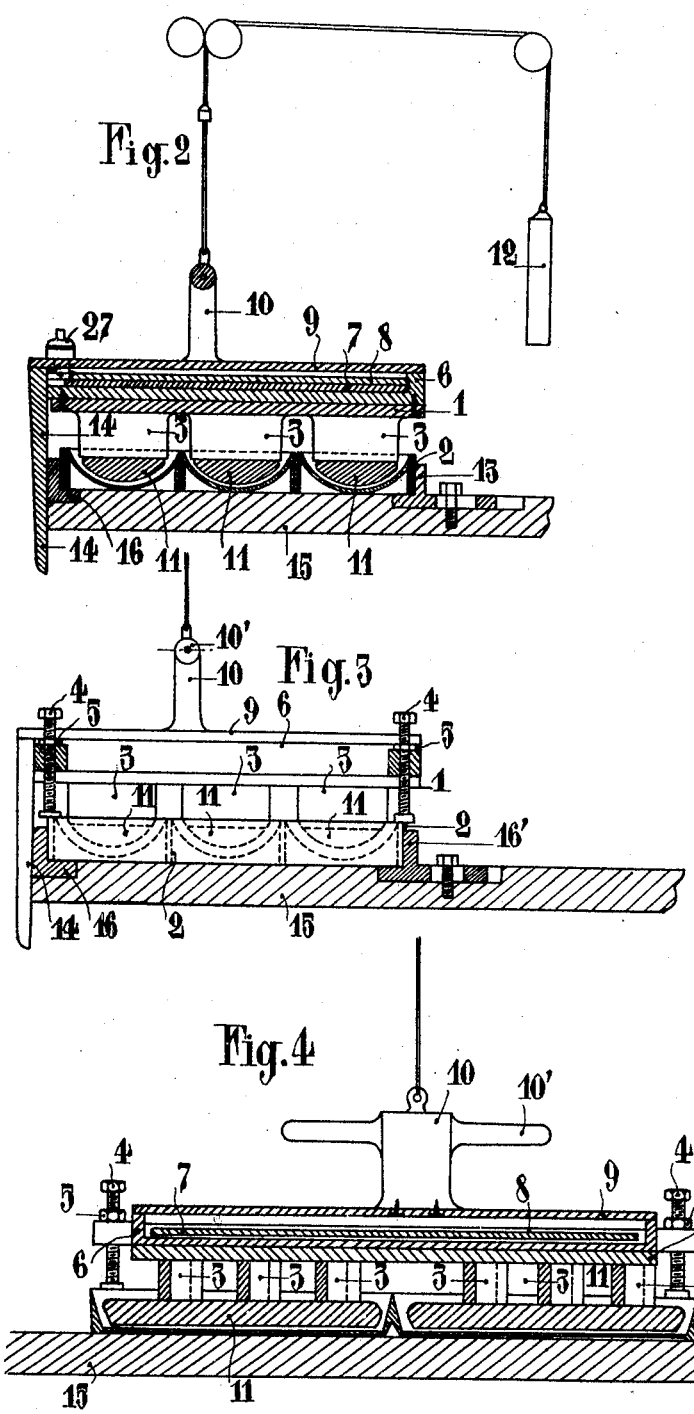
INVENTOR:
Emile L. A. Savy
BY
ATTORNEY

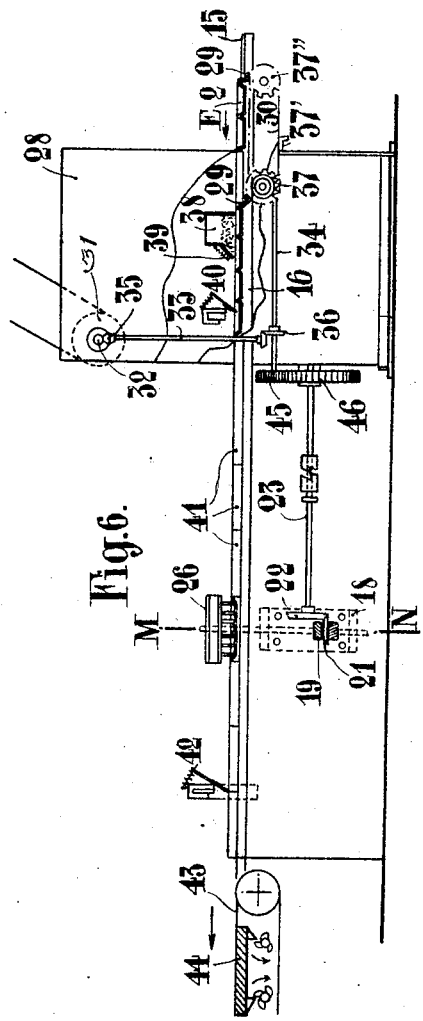

Patented Mar. 16, 1926.

1,576,936

UNITED STATES PATENT OFFICE.

EMILE LOUIS ALFRED SAVY, OF COURBEVOIE, FRANCE.

CONFECTIONERY MACHINERY.

Application filed February 27, 1925. Serial No. 12,091.

*To all whom it may concern:*

Be it known that I, EMILE LOUIS ALFRED SAVY, a citizen of the Republic of France, residing at Courbevoie, Seine, France, have invented certain new and useful Improvements in Confectionery Machinery, of which the following is a specification.

In order to ensure their effective preservation, cream filled and moulded chocolate sweetmeats must be made with a cream or other suitable filling completely enclosed in an as even as possible layer or coating of chocolate.

In the present state of the art the first thing in manufacturing such sweets is to partly fill the moulds, by hand or by machine, with semi-liquid chocolate and then to place in each recess or cavity of the mould the corresponding cream filling, this operation being done with the hand, by guess, and therefore most unevenly; the next thing is to cast over the surface a new layer of chocolate which covers the cream filling, and this layer or coating is evened either by hand with a special knife or by machinery with a scraper under which the moulds are successively fed. Results of such a method can not but be very imperfect.

The object of my invention is to provide a cream or such like filling device that will overcome the above explained defects and may be either hand or machine operated according to the type of moulding machine to which it is applied.

My device can be also advantageously applied to hand moulding by confectioners unequipped with a power-driven moulding machine.

In order to make my machine more clearly understood I have illustrated, as examples, embodiments thereof in and by drawings appended hereto and wherein:

Figure 1 is a plan view of a hand-operated form of filling device;

Figure 2 is a vertical sectional view on line A—B of Figure 1;

Figure 3 is a vertical section on line C—D and Figure 4 a section on line E—F of the same figure;

Figure 5 is a vertical cross-section of a power-operated filling device taken on line M—N of Figure 6;

Figure 6 is a part-sectional side elevation of Figure 5;

Figures 7 and 8 show modifications of the arrangement of the fingers.

In all the figures the same reference letters and numerals denote the same parts.

In principle, my device is composed of a metal plate 1 carrying a series of fingers 3 registering with the cavities of the mould 2 and suitably shaped according to the cream fillings to be inserted.

I will suppose, for instance, that I have to make a most popular sweetmeat, the cream-filled chocolate bar, that the mould 2 comprises six cavities or recesses (these may, of course, be any in number) and that what is required is to force fillings 11 two millimeters down below the top level of the mould. Plate 1 will then carry six series of fingers 3, suitably spaced and inclined 45° in order to maintain rigid the cream filling 11, which is very frail in itself, by engaging several points of its surface while avoiding transverse breaking.

I might, of course, have but a single finger per recess, and cause the said finger to bear on the whole surface of the cream filling, but this method, which I reserve the right to employ for certain articles, is not practical for light and long fillings because it involves the risk that the latter may be lifted through adherence.

Fingers 3 may also be set lengthwise in the case of a very long and thin bar (Figure 7).

Figure 8 shows another modification, the fingers being in this case cylindrical and distributed over the whole surface of a specially-shaped filling.

In a general way, the setting of the fingers is to be varied according to the kind of confections to be made.

The above-mentioned plate 1 is secured by screws or any other means to a metal box 6, preferably made of aluminum, containing a heating electric resistance 7 of any sort.

8 is an asbestos sheet concentrating the heat on the bottom and, through the conductivity of the metal, on the fingers 3 which become sufficiently heated to keep liquid the chocolate with which they are in contact at each stroke. This heating is the essentially characteristic feature of my invention.

Were the fingers cold they would soon get clogged with chilled chocolate, thereby seriously interfering with the even depositing of the cream fillings.

9 is a metal cover fitted with a handle 10 for operating the device, which, for greater convenience and in order to avoid fatiguing the operators, is kept suspended by a counterpoise 12 sufficiently heavy to return it to initial position after each down or working stroke.

13 are the guides of a moulding machine of any kind and between the said guides are fed the moulds which thus present themselves successively under the filling device. The operator has therefore but to press, at the proper moment, on handle 10 in order to bring down the device. Fingers 3 force the fillings into the paste, driving them down a distance limited by the adjustment of the screws 4 which, at the end of the stroke, come to bear on the rim of mould 2.

A heel or spur 14 regulates the transverse motion of the plate in such a way that the series of fingers will automatically place themselves on the axis of the mould cavities or recesses; the operator having to pay attention only to the adjustment of the longitudinal position.

This device adapts itself just as well to machines with continuous feeding as to those with intermittent feeding of the moulds.

In the case of moulding entirely by hand (Figure 2) the moulds are positioned on a table 15 against a corner piece 16 which plays the part of a guide for heel 14. Another adjustable corner-piece 16' (Fig. 3) may also be provided to support the moulds, but this arrangement is not indispensable.

In the case of a moulding machine of large capacity having to be worked, the hand operated filling device becomes quite inadequate, the moulds travelling at such a speed that the operator would not have time enough to make the required movements.

In this case my invention provides for mechanical accomplishment of the movements by arranging the device as shown by Figure 5.

Part 26 is a plate, preferably made of metal, secured by screws 26' to two rods 17 sliding in supports 18 bolted on the frame 18'.

19 is a cross-tie secured to the lower portion of the two rods 17, the parts 26, 17 and 19 constituting a frame to which a suitable device, such as a cam or crank-disk 22, keyed on a shaft 23, is adapted to impart a vertically reciprocating motion; said disk carrying a pin 21 which works in a slot 20 in tie 19.

1 is the interchangeable plate already described when referring to Figures 1, 2, 3 and 4.

25 are threaded rods secured, on the one hand, to the plate 1, and on the other hand, sliding freely in holes bored in the supporting plate 26.

Springs 24 provide a yielding connection between the two parts 1 and 26. Wing nuts 25' with check or lock nuts retain the whole and permit adjustment as to depth.

7 is the heating electric resistance located in this case directly on plate 1 between two asbestos sheets 8 and 8' and suitably connected with the current conductors 27.

Shaft 23, on which is keyed the crank disk 22, is in direct relation with the feeding motion of the moulds, as illustrated by Figure 6, showing a longitudinal section of a well known power-driven moulding machine to which the filling device is applied, such device being also applicable to any already known type of moulding machine.

28 is the heated case of the moulding machine. 16 are the adjustably spaced corner rails between which slide the empty moulds deposited at E. Said moulds are fed successively in the direction of the arrow by a series of cleats or spurs 29 fixed on two parallel chains 30. The spacing between two cleats or spurs being greater than the length of the moulds, the result is that the latter are fed intermittently, making each time a halt the duration of which is proportional to the difference between the length of the mould and the spacing of the driving cleats. It is this halt that I avail myself of, as will be hereinafter apparent to force the cream fillings into the moulds. 31 is the driving pulley of the machine, said pulley being keyed on a horizontal shaft 32 which transmits motion to the cleat- or spur-carrying chains 30 through shafts 33 and 34, bevel pinions 35 and 36 and worm 37 and its associated worm wheel keyed on a horizontal cross-shaft on which are secured the toothed wheels 37' that drive the cleat- or spur-carrying chains 30. Toothed wheels 37" are idle on their axles. Shaft 34 transmits its rotation to shaft 23 through intermeshing gears 45 and 46.

So fed on, moulds 2 pass under a tank 38 which fills them with a layer of chocolate which is evened by a spring scraper 39.

A little farther on a second spring scraper 40, projecting into the recesses or cavities of the moulds partly empties them so as to leave room for the cream fillings, which are deposited at 41 in each recess of the moulds either by hand or by means of a suitable mechanical distributor.

The moulds, continuing to travel, pass successively under the filling device 26, making each time a halt which is taken advantage of, as above indicated, to compress and force the cream down into the paste, the device being immediately afterwards lifted by the action of the crank disk 22 in order to permit the next mould to present itself in its turn. This result is easily obtained by suitably proportioning the ratio of the teeth of gears 45 and 46 and suitably setting the latter respecting the crank disk 22.

The moulds, always continuing to travel, pass under a scraper 42 which spreads over the bared fillings the chocolate that is forced up in consequence of the driving in of the fillings. The moulds are then automatically shifted to a conveyor band 43 whereon they are slightly patted, either by an ordinary patting machine or by a vibrating plate of any kind.

This operation glazes the surface of the confections which are finally cooled automatically in an adjacent ejecting mechanism, removed from the moulds and packed.

Having now particularly ascertained and described the nature of my said invention as well as the manner in which the same is to performed, I declare that what I claim is:

1. A confectionery machine, comprising a support for a series of moulds having cavities for the individual confections adapted to receive a coating layer; and a vertically-movable presser unit for forcing fillings into the coating layers, embodying a plate provided with depending presser fingers disposed in register with said cavities to enter the same during the descent of the unit, and means for heating said plate and fingers.

2. A confectionery machine, comprising a support for a series of moulds having cavities for the individual confections adapted to receive a coating layer; and a vertically-movable presser unit for forcing fillings into the coating layers, embodying a carrier, and a plate removably and interchangeably attached to the carrier and provided with depending presser fingers disposed in register with the mould cavities to enter the same during the descent of said unit.

3. A confectionery machine, comprising a support for a series of moulds having cavities for the individual confections adapted to receive a coating layer; and a vertically-movable presser unit for forcing fillings into the coating layers, embodying a carrier, a plate removably and interchangeably attached thereto and provided with depending presser fingers disposed in register with the mould cavities to enter the same during the descent of said unit, and means for heating said plate and fingers.

4. A confectionery machine, comprising a support for a series of moulds having cavities for the individual confections adapted to receive a coating layer; and a vertically-movable presser unit for forcing fillings into the coating layers, embodying a plate provided with depending presser fingers disposed in register with said cavities to enter the same during the descent of the unit, means for heating said plate and fingers, and means for concentrating the heat directly upon the plate.

5. A confectionery machine, according to claim 4, in which the heat-concentrating means comprises an asbestos sheet disposed upon the heating means.

6. A confectionery machine, comprising a support for a series of moulds having cavities for the individual confections adapted to receive a coating layer; a reciprocatory presser unit for forcing fillings into the coating layers, embodying a vertical frame consisting of connected top, bottom and side members, and a plate attached to the top member and provided with depending presser fingers disposed in register with the mould cavities to enter the same during the descent of the frame; and operating means for said frame connected to the bottom member thereof.

7. A confectionery machine, according to claim 6, in which the bottom member of the frame is formed with a longitudinal slot; and in which the frame-operating means includes a rotary disk having a crank pin engaged in such slot.

8. A confectionery machine, comprising a support for a series of moulds having cavities for the individual confections adapted to receive a coating layer; and a reciprocatory presser unit for forcing fillings into the coating layers, embodying a vertical frame consisting of connected top, bottom and side members, and a plate yieldingly suspended from the top member and provided with depending presser fingers disposed in register with the mould cavities to enter the same during the descent of the frame.

9. A confectionery machine, according to claim 4, in which the heating means comprises a resistance plate and means for supplying an electric current thereto; and in which the heat-concentrating means comprises an asbestos sheet disposed upon such plate.

In testimony whereof I affix my signature.

EMILE LOUIS ALFRED SAVY.